Patented Mar. 18, 1924.

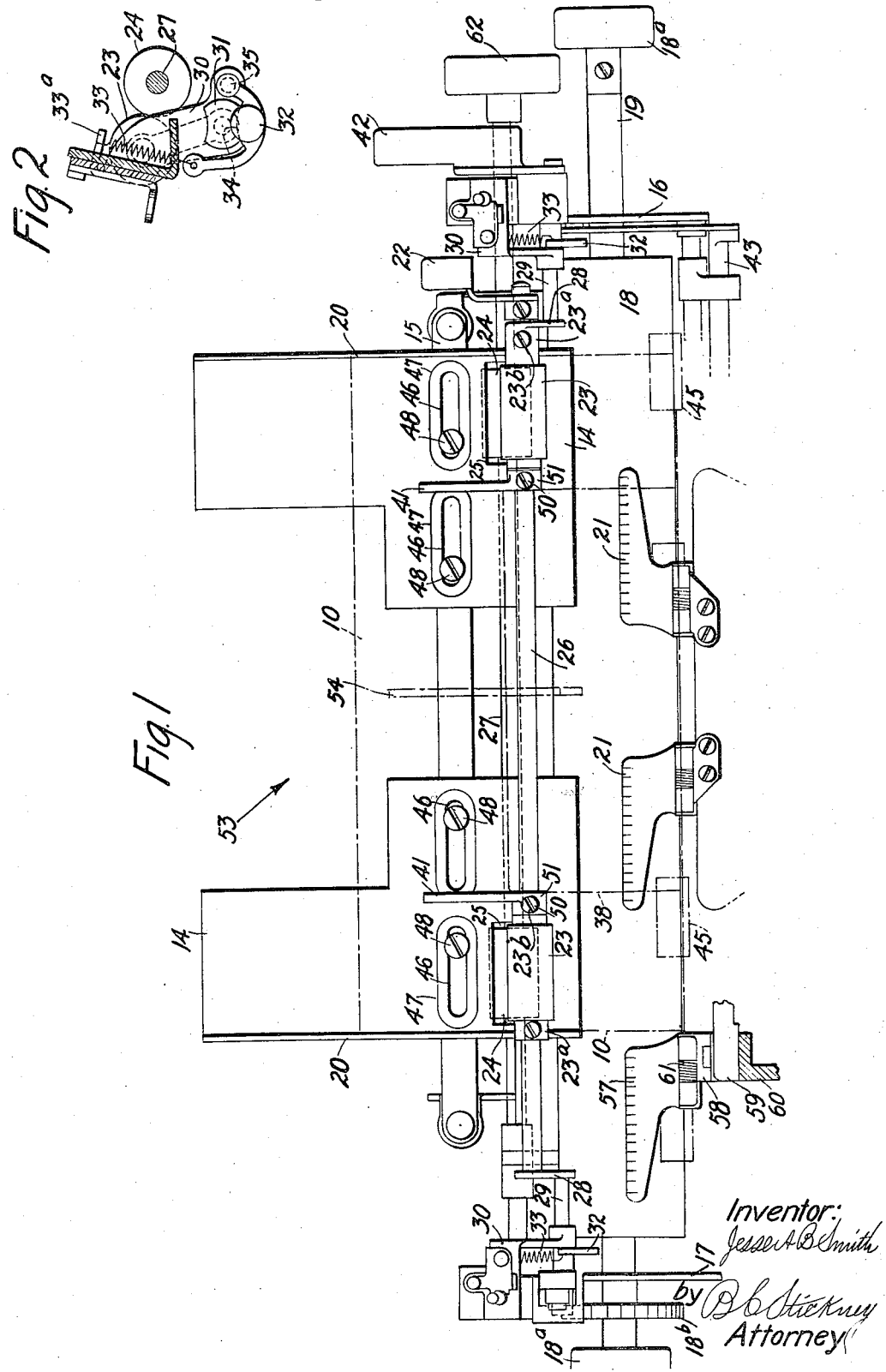

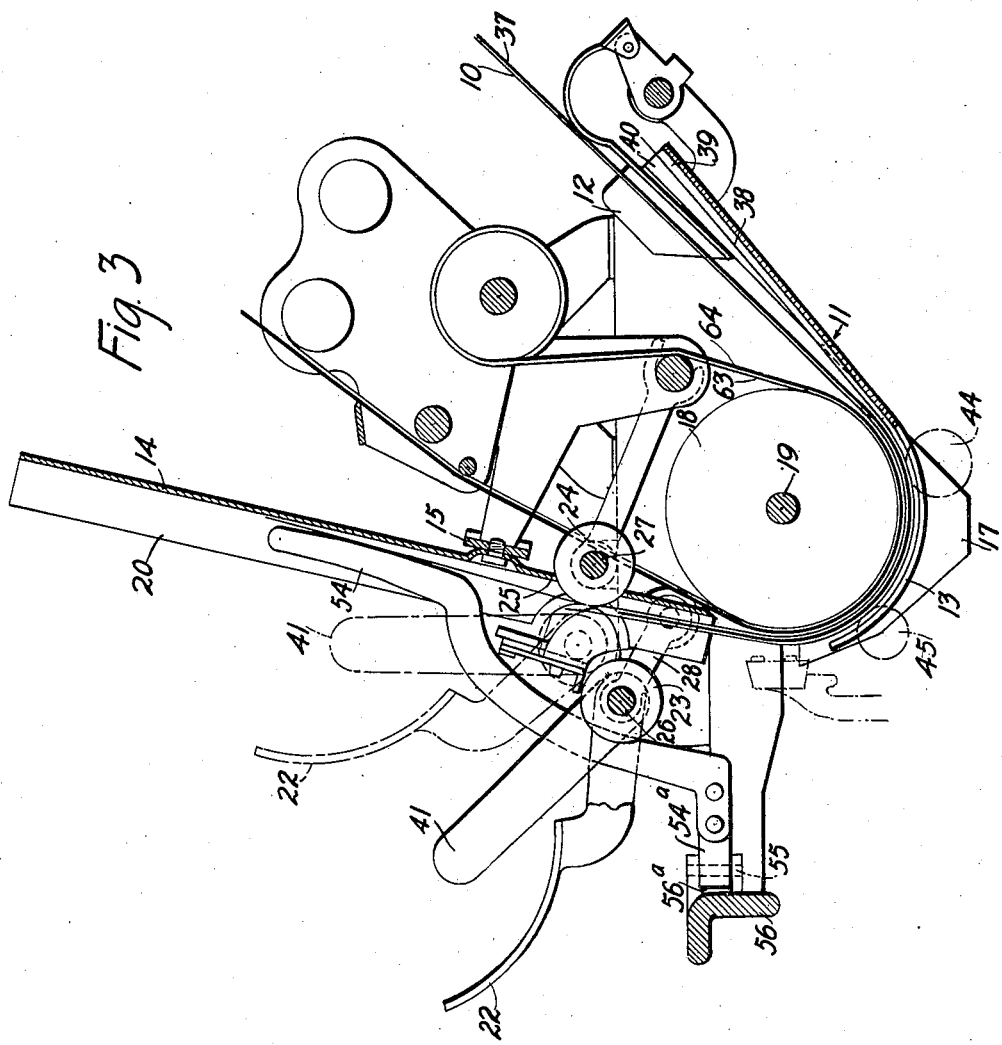

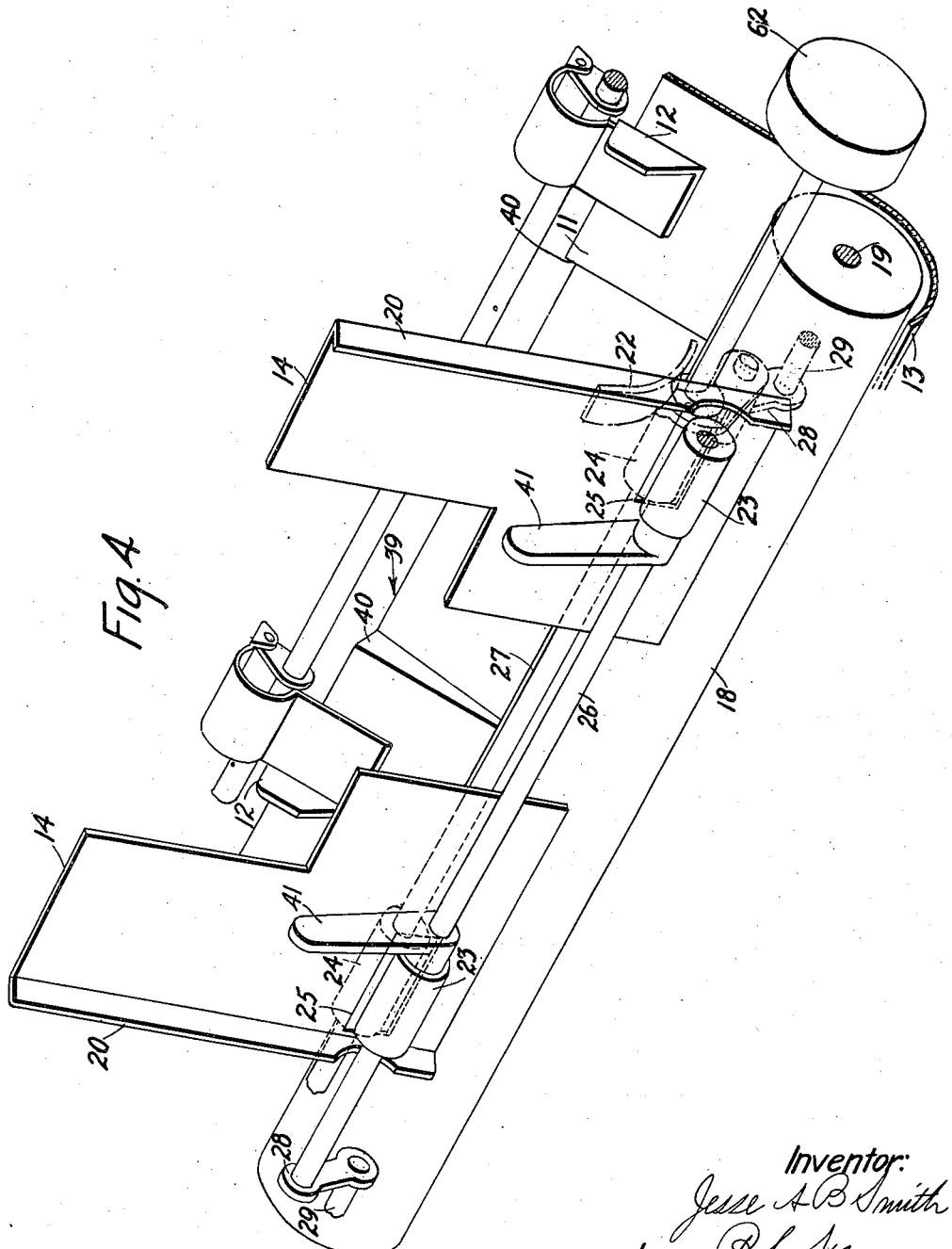

1,487,671

UNITED STATES PATENT OFFICE.

JESSE A. B. SMITH, OF STAMFORD, CONNECTICUT, ASSIGNOR TO UNDERWOOD TYPEWRITER COMPANY, OF NEW YORK, N. Y., A CORPORATION OF DELAWARE.

TYPEWRITING MACHINE.

Application filed August 20, 1920, Serial No. 404,882. Renewed July 17, 1922. Serial No. 575,577.

*To all whom it may concern:*

Be it known that I, JESSE A. B. SMITH, a citizen of the United States, residing in Stamford, in the county of Fairfield and State of Connecticut, have invented certain new and useful Improvements in Typewriting Machines, of which the following is a specification.

This invention relates to typewriting machines, and is herein disclosed as applied to an Underwood machine, and as particularly adapted to facilitate the rapid aligning and gaging of superposed work-sheets, such as are often used in the operation of billing. In billing operations, it is often desired to accurately align one work-sheet or record sheet, and then align outside of it a second sheet, the two sheets being separately gaged longitudinally to permit the various entries made at intervals upon the record sheet to be accurately aligned one under another.

According to the present invention, a wide record sheet may be gaged by passing it down over the usual rear paper-table, and bringing it up in front of the platen, so that its upper end lies upon a front paper-table. When gaged there, the sheet may be held in position by actuating a finger-piece to cause feed-rolls to grasp it. These feed-rolls are advantageously positioned at the front paper-table, and advantageously lie outside of the margins of the narrower work-sheet upon which most of the original entries are to be made. The narrower sheet is then passed down within a chute, which may be formed in the rear paper-table to carry the narrower sheet clear of the first inserted sheet, and guided upwardly between side gages which stand clear of the front paper-table, but which are, nevertheless, near enough thereto to enable the narrower work-sheet to be gaged by them. The usual feed-roll release handle may then be actuated to clamp both work-sheets against the platen and typing may proceed.

In order to maintain the work-sheets in proper position on the front paper-table, provision may be made of an upwardly-extending finger to engage the work-sheets at a point intermediate their edges. If desired, the finger may be mounted for movement to and from its effective position.

It will be seen that the mechanism of the present invention is especially adapted for use in conjunction with tally-strip devices, in that the wide work-sheet may be adjusted in position, without disturbing a tally-strip lying between the same and the platen, by means of suitable devices such as feed-rolls adjacent the front paper-table.

To facilitate insertion of the two work-sheets when the platen is near one end of its travel, as it is before being brought back for the beginning of a new line of typing, there may be provided an auxiliary wing-scale, the upper edge of which, either alone or in connection with the upper edges of the other wing-scales, may serve as a gage for the writing line of a work-sheet being brought to adjusted position. The end wing-scale or auxiliary wing-scale may be substantially of the usual construction, and may be mounted upon a lug projecting upwardly from the usual frame of the typewriting machine.

Other features and advantages will hereinafter appear.

In the accompanying drawings,

Figure 1 is a fragmentary front view of an Underwood standard typewriting machine, showing the present invention as applied thereto.

Figure 2 is a detail, showing a suitable mounting for the auxiliary front feed-rolls.

Figure 3 is a sectional side view of the parts seen in Figure 1, showing the auxiliary feed-rolls cast off in full lines, and in effective position in dotted lines, and also showing a tally-strip device mounted upon the machine.

Figure 4 is a diagrammatic perspective view of the principal parts shown in Figure 1.

When it is desired to align an inner wide work-sheet 10, so that it may be typed at the proper column upon the typewriting machine, it is passed downwardly over a rear paper-table 11 between adjustable side gages 12, which serve to center it upon the platen, and then the work-sheet, after passing beneath the platen, is guided upwardly by the front extension 13 of the paper-table 11, and falls upon an upper front paper-table 14, comprising two sections which may be adjustably carried upon a support 15, suitably mounted upon the end plates 16 and 17 of the shift frame in which the platen 18 is journaled by its axle 19.

The paper-table 14 is provided with turned-up side-edge gages 20, which serve as side gages and co-operate with the side gages 12, to properly center the work-sheet 10 upon the platen. When the work-sheet 10 has been adjusted at the desired line-space by bringing any desired ruled line thereon level with the usual wing-scales 21, a finger-piece 22 may be actuated to swing upper front feed-rolls 23 rearwardly, so that they will grip the work-sheet 10 against rear feed-rolls 24, which lie for the most part behind the paper-table 14, but project through openings 25 thereof, so that the work-sheet 10 is gripped between the two sets of feed-rolls 23 and 24 mounted on shafts 26 and 27, respectively. The shaft 26, on which feed-rolls 23 are held in adjusted position by means of collars 23$^a$ and set-screws 23$^b$, may be swung rearwardly, in the manner described, because it is fast upon rock-arms 28, which, in turn, are fast upon short shafts 29 projecting inwardly from brackets 30, of which there is one mounted upon each end plate 16 and 17. The shafts 29 are journaled in their respective brackets 30, and normally press the feed-roll or rolls 23 rearwardly because each shaft 29 carries upon an extension thereof a cam 31, against which bears a follower 32, which is drawn by a spring 33, to center the follower 32 in a depression 34 of the cam 31.

When it is desired to move the feed-rolls 23 forwardly, in the manner described above, the finger-piece 22 is actuated to move the shaft 26 in the direction desired against the tension of the spring 33. The follower 32 may be pivoted at 35 upon an extension of the bracket 30, and the spring 33, which is attached to the follower 32 at one end, may be attached at its other end to a pin 33$^a$.

After the work-sheet 10 and a carbon 37 therefor have been adjusted at the desired position, a second narrower outside work-sheet 38 may be adjusted in position by passing it down within a depression or chute 39 of the paper-table 11, which serves to carry it for the most part clear of the carbon associated with the work-sheet 10. The depression 39 merges at the front of the machine into the front extension 13, with the result that the sheet 38 is carried upwardly in front of the platen to the paper-table 14. The work-sheet 38 may be gaged at its sides by the side walls 40 of the depression 39, and these walls co-operate with arms or side gages 41 fast upon the shaft 26 to accurately center the work-sheet 38 upon the paper-table 14 and upon the underlying work-sheet 10. The arms 41, which serve as side gages for the work-sheet 38, may always stand clear of the paper-table 14, but, as indicated in the dotted-line position of the front feed-rolls 23 in Figure 3, they may be brought close enough to the front paper-table 14 to enable them to be readily utilized as side gages.

When the work-sheet 38 has been aligned at the desired line by the wing-scales 21, the usual main feed-roll casting-off lever 42 may be actuated to rock the release shaft 43 and allow the usual feed-rolls 44 and 45 to be thrown against the platen 18, which may be actuated by means of finger-wheels 18$^a$ or line-spacing mechanism including a ratchet-wheel 18$^b$. The work-sheets 10 and 38 thereafter are fed together, and, to facilitate their feeding, if necessary, the typist may cast off the feed-rolls 23. To facilitate the adjustment of the front paper-table 14 to suit various widths of sheets, it may be formed in two separated parts, each provided with a pair of openings 46 in the form of slots at the bottoms of depressions 47, to permit headed screws 48 threaded into the support 15 to hold the parts in any desired positions of adjustment. It will be seen that in order to adjust, to any great extent, the sections or parts of the front paper-table 14, it will be necessary to adjust the feed-rolls 24 along the shaft 27. To this end, the feed-rolls 24 may be adjustably secured on shaft 27 by any suitable means (not shown). When the sections of paper-table 14 and the feed-rolls 24 are thus adjusted, the feed-rolls 23 may be correspondingly adjusted by loosening the set-screws 23$^b$ and 50, which respectively hold the collars 23$^a$ and the collars 51 of the arms 41 in position.

In order to avoid the use of unnecessary material and to render the parts as accessible and as open to view as possible, the upper paper-table 14 may be largely cut away as at 53, thus enabling it to have long turned-up margins to serve as edge gages 20, while the body of the table is comparatively short. In order to hold the two work-sheets close to the face of the table 14, there may be provided a finger 54 extending upwardly to lie almost flush with the surface of the work-sheets as they lie flat upon the paper-table 14, said finger being secured to a block 54$^a$ pivoted at 55 upon the front bar 56 of the typewriter carriage and yieldingly held in desired position, either effective or ineffective, by means of a leaf spring 56$^a$ in the same manner as the envelope-holding devices now found on many Underwood standard typewriting machines.

To enable the work-sheets to be adjusted easily, even though the typewriter carriage is at one end of its travel, there may be provided auxiliary wing-scales 57, of which one, near the left-hand limit of the travel of the typewriter carriage, is shown in Figure 1. This wing-scale may be journaled upon a lug 58 fast to an upward extension 59 of the usual frame 60 of the typewriting machine, and may be held against swinging too far rearwardly under the pressure of its spring 61 by a short arm, not shown herein, of the usual kind provided on wing-scales.

When the feed-rolls 23 have been swung to the rear to press the record sheet against the feed-rolls 24, further adjustment of the wide or record sheet may be effected by means of a finger-wheel 62 mounted on shaft 27. The mechanism just described is peculiarly adapted for use with tally-strip mechanism in that the wide sheet may, when feed-rolls 44 and 45 are cast off, be shifted by means of rolls 23 and 24 without disturbing a tally-strip 63, passing around the platen beneath the wide work-sheet 10. The tally-strip 63 and its carbon 64 may be controlled by mechanism of the same general form as that disclosed in the patent to Hart, No. 1,281,160, dated October 8, 1918. The shifting of the feed-rolls 44 and 45 to and from effective position may also be effected by means such as disclosed in said patent.

It will be seen that there are two means for feeding the wide work-sheet 10—a primary feeding means including the platen 18 and the feed-rolls 44 and 45, and a secondary feeding means including the rolls 23 and 24.

The operation of the embodiment of the invention shown in the drawings may be summed up as follows: After the ledger-sheet 10 and bill-sheet 38 have been typed, they may be withdrawn from the machine and replaced by new sheets to be typed, while the tally-strip 63 may remain in the machine. Preparatory to inserting a new ledger-sheet and bill-sheet, the tally-strip 63 may be advanced in the usual way by means of the tally-strip mechanism, and also the tally-strip mechanism will be effective to hold the tally-strip stationary while the new sheets are being inserted and adjusted to the typing position. When a ledger-sheet 10 has been inserted, it may be adjusted relatively to the tally-strip 63, to bring the ledger-sheet to the typing position, by means of the auxiliary rolls or collating rolls 23 and 24, while the tally-strip 63 is held in typing position by means of the tally-strip mechanism. If desired, the tally-strip 63 may be advanced after the ledger-sheet 10 has been adjusted, the ledger-sheet then being held in adjusted position by means of the collating rolls 23 and 24, which also constitute sheet-holding rolls. While the ledger-sheet is held in adjusted position by the collating rolls 23 and 24, one or more outer work-sheets, for example, the bill-sheet 38, may be inserted and adjusted relatively to the ledger-sheet 10, thereby to bring this outer sheet (or sheets) to the typing position. The platen feed-rolls 44 and 45 are then thrown on, and the collating rolls 23 and 24 may then be advantageously released. The typing operation may then proceed, the ledger-sheet 10 and bill-sheet 38 being line-fed by the platen and its usual feed-rolls 44 and 45, and the tally-strip 63 being controlled by the tally-strip mechanism.

Variations may be resorted to within the scope of the invention, and portions of the improvements may be used without others.

Having thus described my invention, I claim:

1. In a typewriting machine, the combination with a platen and a platen frame, of a rear paper-table fixed in said frame, a front paper-table, devices associated with the rear paper-table for separately aligning thereon in superposed relation a wide work-sheet and a narrow work-sheet lying between the edges of the wide work-sheet, and devices at said front paper-table adapted to separately align each sheet to conform to its rear alignment.

2. In a typewriting machine, the combination with a platen and a platen frame, of a front paper-table, a side gage on said table, a feed-roll behind the table, a feed-roll in front of the table co-operating with the first feed-roll to feed work-sheets, means for moving the front feed-roll clear of the table, and a gage clear of the table, and adapted to be moved outward with the front feed-roll.

3. In a typewriting machine, the combination with a platen and a platen frame, of a front paper-table, a side gage on said table, a feed-roll behind the table, a shaft in front of the table and carrying a front feed-roll, a support for said shaft mounted to swing to and from the table, and a side-gaging device carried on said shaft.

4. In a typewriting machine, in combination, a platen, a front paper-table provided with side-edge gages to receive a work-sheet, rear feed-rolls projecting through said front paper-table near said edge gages, front feed-rolls to co-operate with said rear feed-rolls and movable to and from the same, means to guide a narrower work-sheet to the portion of the paper-table between the co-operating front and rear feed-rolls, and means to turn the feed-rolls and thereby shift the position of the wider work-sheet.

5. In a typewriting machine, in combination, a platen, a front paper-table, rear feed-rolls projecting through said paper-table, near its side edges, front feed-rolls to co-operate with said rear feed-rolls to grip the side portions of a sheet passed therebetween, means to separate said front and rear feed-rolls to release the work-sheet, and means to guide a narrower work-sheet to the portion of said paper-table lying between the sets of feed-rolls and outside of the first-mentioned work-sheet.

6. In a typewriting machine, in combination, a platen, a front paper-table, rear feed-rolls projecting through said paper-table near its side edges, front feed-rolls to co-operate with said rear feed-rolls to grip the side portions of a sheet passed therebetween, means to separate said front and rear feed-rolls to release the work-sheet, and means to guide a narrower work-sheet to the portion of said paper-table lying between the sets of feed-rolls and outside of the first-mentioned work-sheet, said guiding means including edge gages movable to and from effective position as said front and rear feed-rolls are shifted into and out of effective position.

7. In a typewriting machine, in combination, a platen, a front paper-table provided with openings near its side edges, means to grip the edge portions of a wide sheet on said paper-table, including rear gripping elements to engage said sheet through said openings and front gripping elements to co-operate with said rear gripping elements, means to separate said front and rear gripping elements to release the sheet, means to actuate said gripping elements, while in effective relation, to shift the work-sheet gripped therebetween, means to guide a narrower work-sheet to the portion of the front paper-table between the sets of co-operating gripping elements, and means to feed said work-sheets together when the wide sheet has been released from said gripping elements.

8. In a typewriting machine, in combination, a platen, a platen frame comprising a front rail, a front paper-table and a paper-finger, mounted on said front rail of the platen frame, to maintain work-sheets in proper relation with said front paper-table.

9. In a typewriting machine, in combination, a platen, a front paper-table and a centrally-positioned paper-finger extending upwardly along the front paper-table to maintain work-sheets in position thereagainst.

10. In a typewriting machine, in combination, a platen, a platen frame, a front paper-table, devices for facilitating the adjustment of work-sheets on said paper-table, and a paper-finger on the front of the platen frame extending upwardly along said paper-table to maintain the work-sheets in position thereon, said paper-finger being so mounted that it will be held yieldingly in effective or ineffective position when so placed.

11. In a typewriting machine, in combination, a platen, a platen frame, a front paper-table, rear feed-rolls projecting therethrough near the side edges, a shaft on which said rear feed-rolls are mounted, front feed-rolls to co-operate with said rear feed-rolls, a front shaft on which said front feed-rolls are mounted, means to shift said front shaft to bring said front feed-rolls into and out of position to co-operate with the rear feed-rolls, and a paper-finger mounted on the front of the platen frame and extending upwardly to co-operate with said front paper-table, said paper-finger being shaped to clear said front shaft and having its upper portion shaped to follow the contour of the paper-table.

12. In a typewriting machine, in combination, a platen, means to maintain a tally-strip in position on said platen, a front paper-table behind which said tally-strip passes, means associated with the front paper-table for holding and feeding a work-sheet passed around said platen outside of the tally-strip, and gaging means, effective while said work-sheet is held by said last-mentioned means, to enable proper positioning of a second work-sheet on said paper-table without affecting the adjustment of the first-mentioned work-sheet.

13. In a typewriting machine, in combination, a platen, means for maintaining a tally-strip in position on said platen, a front paper-table behind which the tally-strip passes in leaving the platen, rear feed-rolls extending to the front of said front paper-table to receive the margins of a wide work-sheet and spaced sufficiently to permit a narrow sheet to pass between them, front feed-rolls to co-operate with said rear feed-rolls to hold the wide work-sheet in adjusted position and to enable feeding thereof by said front and rear feed-rolls, means whereby said front and rear feed-rolls may be actuated, means whereby said front feed-rolls may be shifted to and from effective position with respect to the rear feed-rolls, and side-edge guides for said narrow sheet movable to and from said paper-table with said front feed-rolls.

14. In a typewriting machine, in combination, a platen, a platen frame, a front paper-table, rear feed-rolls extending through said paper-table near its side edges, front feed-rolls to co-operate with said rear feed-rolls, a shaft on which said front feed-rolls are mounted, edge-gages on said shaft spaced for guiding a work-sheet to the portion of the paper-table between the rear feed-rolls, means to shift said shaft to move said front feed-rolls and edge-gages to and from effective position, and a paper-finger to co-operate with said paper-table, said paper-finger being mounted on the front of the platen frame and so shaped as to give suitable clearance for the shaft carrying the front feed-rolls, and to have a work-sheet-engaging portion to prevent separation of work-sheets from the paper-table.

15. In a typewriting machine, in combination, work-feeding means, including a platen, a front paper-table, tally-strip mechanism co-operating with a tally-strip passing around the platen and behind the front paper-table, means adapted to co-operate with a work-sheet on the front paper-table to shift the same without disturbing the tally-strip, and to hold said work-sheet in adjusted position while another work-sheet is inserted and adjusted, and side-edge gaging means to effect proper positioning of the last-mentioned work-sheet.

16. In a typewriting machine, in combination, a platen, side-edge gaging means for positioning a wide sheet on the platen, wing-scales adjacent the printing point to assist in obtaining the desired writing-line position for work-sheets placed on the platen, gaging means for positioning a narrow work-sheet on said platen, and an additional wing-scale near one side of the machine to facilitate the writing-line-positioning of the narrow sheet when the platen is at that side of the machine.

17. In a typewriting machine, in combination, a platen, means for holding a wide work-sheet in position relative to said platen, writing-line indicators adjacent the printing point, side-edge gaging means for positioning a narrow work-sheet inserted outside of the wide work-sheet, and a writing-line indicator at one side of the machine to facilitate the adjustment of the narrow sheet when the platen is at that side of the machine.

18. In a typewriting machine, in combination, a platen, a front paper-table comprising two sections having side gages at their outer edges and adjustable toward and from each other to accommodate work-sheets of different widths, and a centrally-positioned paper-finger extending upwardly substantially along the plane of the front faces of said sections to maintain a work-sheet in position against said paper-table.

19. In a typewriting machine, in combination, primary means, including a revoluble platen, for feeding a work-sheet past the printing line, means to release said feeding means, and auxiliary means at the delivery side of the platen to feed said work-sheet when the latter is released from the primary feeding means.

20. In a front-strike typewritting machine, the combination with a revoluble platen, of means whereby work-paper on the platen may be held stationary while a work-sheet is being adjusted thereover, a collating table at the delivery side of the platen to receive said work-sheet, front and rear releasable co-operating collating rolls associated with the collating table to grip between them the work-sheet which lies on the collating table and extends around the platen, the plane of said table lying between the front and rear rolls to enable said rolls to effect a collating movement of the sheet lying upon said table, and means for rotating said collating rolls to adjust the work-sheet while the work-paper is held stationary by said holding means.

21. In a front-strike typewriting machine, the combination with a revoluble platen, of a device independent of the platen for feeding an inner ply of work-paper around the platen and whereby said inner ply of work-paper may be held stationary while an overlying work-sheet is being adjusted, a collating table at the delivery side of the platen to receive said overlying work-sheet and behind which said inner ply of work-paper passes, front and rear co-operating collating rolls associated with the collating table to grip said overlying work-sheet therebetween and to adjust it and also to hold it against displacement while it extends around the platen, and means for rotating said rolls to adjust said overlying work-sheet while the inner ply of work-paper is held stationary by said independent device, said collating rolls serving to hold said overlying work-sheet while said inner ply of work-paper is fed by said independent device.

22. In a front-strike typewriting machine, the combination with a revoluble platen, of a collating table at the delivery side of the platen, front and rear co-operating collating rolls associated with the collating table to grip and hold a work-sheet passing around the platen and over said collating table, means for rotating one of said collating rolls to adjust the work-sheet relatively to the printing line on the platen, and sheet-aligning means at the front of the platen to enable an overlying work-sheet to be adjusted relatively to the printing line while the work-sheet gripped by the collating rolls is held in adjusted position thereby.

23. In a front-strike typewriting machine, the combination with a revoluble platen, of means whereby an inner ply of work-paper on the platen may be held stationary while an overlying work-sheet is being adjusted, a collating table at the delivery side of the platen to receive said overlying work-sheet, front and rear co-operating collating rolls associated with the collating table to grip said overlying work-sheet therebetween to adjust it and also to hold it against displacement while it extends around the platen, means for rotating said collating rolls to adjust said overlying work-sheet while the inner ply of work-paper is held stationary by said holding means, and sheet-aligning means at the front of the platen to enable an outer work-sheet to be adjusted while the work-sheet gripped by the collating rolls is held in adjusted position thereby.

24. In a front-strike typewriting machine, the combination with a revoluble platen, of means whereby a work-paper on